US012159536B2

(12) United States Patent
Sujan et al.

(10) Patent No.: US 12,159,536 B2
(45) Date of Patent: Dec. 3, 2024

(54) PLATOON SYSTEM FOR VEHICLES

(71) Applicant: Cummins Inc., Columbus, IN (US)

(72) Inventors: Vivek Anand Sujan, Columbus, IN (US); Phani Kiran Vajapeyazula, Columbus, IN (US); Govindarajan Kothandaraman, Columbus, IN (US); Jingxuan Liu, Columbus, IN (US); Kenneth M. Follen, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/144,722

(22) Filed: May 8, 2023

(65) Prior Publication Data

US 2023/0274648 A1 Aug. 31, 2023

Related U.S. Application Data

(63) Continuation of application No. 17/195,336, filed on Mar. 8, 2021, now Pat. No. 11,682,306, which is a
(Continued)

(51) Int. Cl.
*G08G 1/16* (2006.01)
*B60W 30/16* (2020.01)
(Continued)

(52) U.S. Cl.
CPC ............. *G08G 1/22* (2013.01); *B60W 30/16* (2013.01); *G05D 1/0295* (2013.01); *H04W 4/46* (2018.02);
(Continued)

(58) Field of Classification Search
CPC .......... G08G 1/16; B60W 30/165; G05D 1/02
See application file for complete search history.

(56) References Cited

U.S. PATENT DOCUMENTS

| 8,744,666 B2 | 6/2014 | Switkes et al. |
| 8,948,995 B2 | 2/2015 | Pandita et al. |

(Continued)

FOREIGN PATENT DOCUMENTS

| WO | WO-2014/092628 A1 | 6/2004 |
| WO | WO-2015/047181 A1 | 4/2015 |

(Continued)

OTHER PUBLICATIONS

Non-Final Office Action on U.S. Appl. No. 17/195,336 DTD Oct. 26, 2022.
(Continued)

*Primary Examiner* — Tan Q Nguyen
(74) *Attorney, Agent, or Firm* — Foley & Lardner LLP

(57) ABSTRACT

Systems and apparatuses include one or more processing circuits including one or more memory devices coupled to one or more processors. The one or more memory devices are configured to store instructions thereon that, when executed by the one or more processors, cause the one or more processors to: receive a parameter regarding operation of a first vehicle of a first platoon; compare the parameter to a first predetermined threshold; responsive to determining that the parameter satisfies the first predetermined threshold, determine an exit parameter for the first vehicle; and cause the first vehicle to exit the first platoon based on the exit parameter.

19 Claims, 12 Drawing Sheets

Related U.S. Application Data continuation of application No. 16/173,264, filed on Oct. 29, 2018, now Pat. No. 10,943,490.

(60) Provisional application No. 62/579,733, filed on Oct. 31, 2017.

(51) Int. Cl.
  *G05D 1/00*   (2006.01)
  *G08G 1/00*   (2006.01)
  *H04W 4/46*   (2018.01)
  *B60W 30/165*  (2020.01)

(52) U.S. Cl.
  CPC ..... *B60W 2510/18* (2013.01); *B60W 2530/10* (2013.01); *B60W 2554/801* (2020.02)

(56) References Cited

U.S. PATENT DOCUMENTS

| | | | |
|---|---|---|---|
| 9,582,006 | B2 | 2/2017 | Switkes et al. |
| 10,017,179 | B2 | 7/2018 | Alden et al. |
| 10,186,148 | B2 | 1/2019 | Umehara |
| 10,380,898 | B1 | 8/2019 | Schubert et al. |
| 2008/0009985 | A1 | 1/2008 | Plishner et al. |
| 2008/0134955 | A1 | 6/2008 | Morrow |
| 2009/0157461 | A1 | 6/2009 | Wright et al. |
| 2010/0256852 | A1 | 10/2010 | Mudalige |
| 2013/0015984 | A1 | 1/2013 | Yamashiro |
| 2013/0211624 | A1 | 8/2013 | Lind et al. |
| 2015/0148984 | A1* | 5/2015 | Padulosi ............... B61L 25/028 701/1 |
| 2015/0154871 | A1 | 6/2015 | Rothoff et al. |
| 2016/0019782 | A1 | 1/2016 | Alam et al. |
| 2016/0054735 | A1 | 2/2016 | Switkes et al. |
| 2016/0163200 | A1 | 6/2016 | He et al. |
| 2017/0011633 | A1 | 1/2017 | Boegel |
| 2017/0178514 | A1 | 6/2017 | Dry |
| 2017/0293296 | A1 | 10/2017 | Stenneth et al. |
| 2017/0349176 | A1 | 12/2017 | Alden et al. |
| 2018/0190119 | A1 | 7/2018 | Miller, Jr. et al. |
| 2018/0210461 | A1 | 7/2018 | Cremona et al. |
| 2019/0260485 | A1* | 8/2019 | Byun ..................... H04W 4/40 |
| 2019/0346864 | A1 | 11/2019 | Switkes et al. |
| 2020/0166953 | A1 | 5/2020 | Sabau |
| 2020/0241563 | A1* | 7/2020 | Van Der Knaap ....... G08G 1/22 |
| 2021/0132630 | A1* | 5/2021 | Bergquist ............ B60W 30/165 |
| 2023/0139242 | A1* | 5/2023 | Füreder ................ G08G 1/0116 340/933 |

FOREIGN PATENT DOCUMENTS

| | | | |
|---|---|---|---|
| WO | WO-2016/134770 A1 | 9/2016 | |
| WO | WO-2017/035516 A1 | 3/2017 | |
| WO | WO-2017164792 A1 * | 9/2017 | ......... B60W 30/165 |

OTHER PUBLICATIONS

Notice of Allowance on U.S. Appl. No. 17/195,336 DTD Feb. 7, 2023.

* cited by examiner

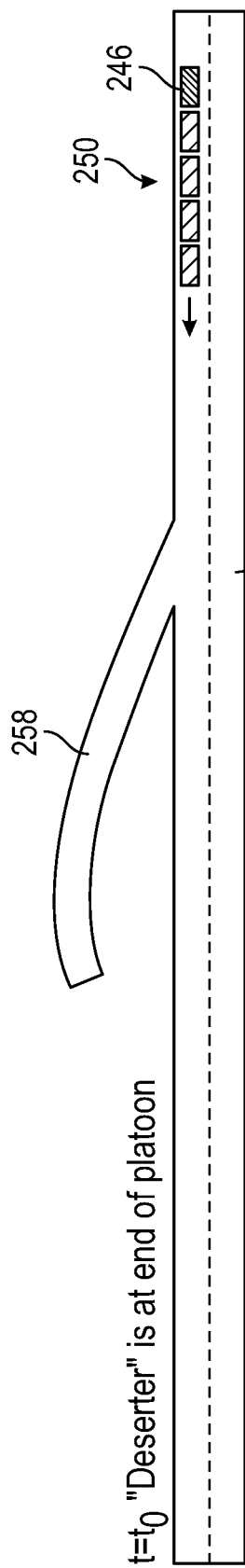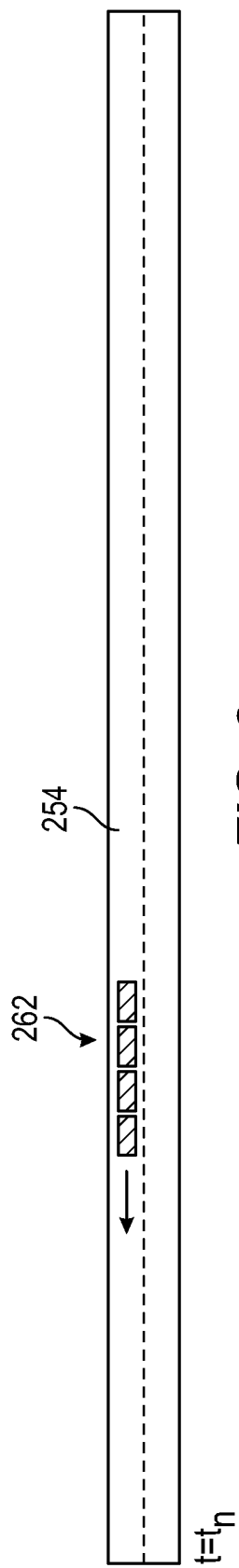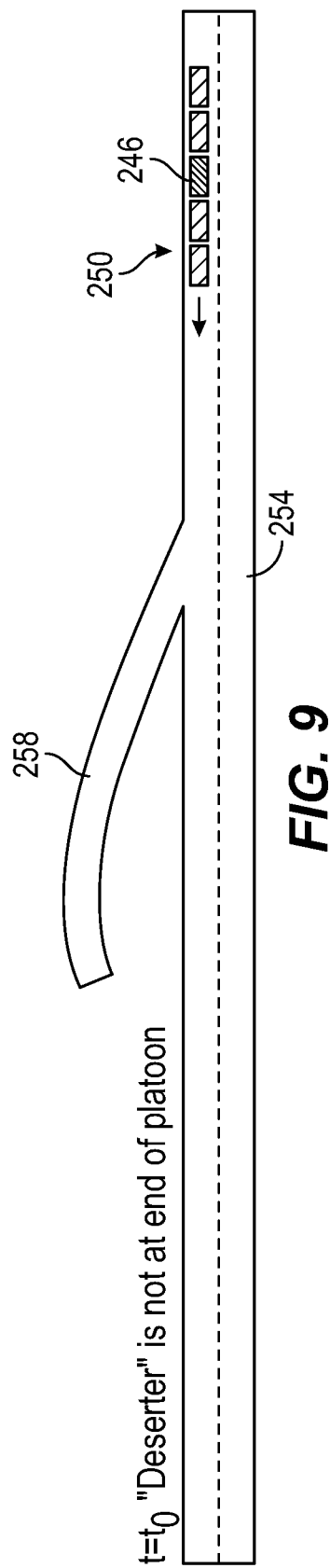

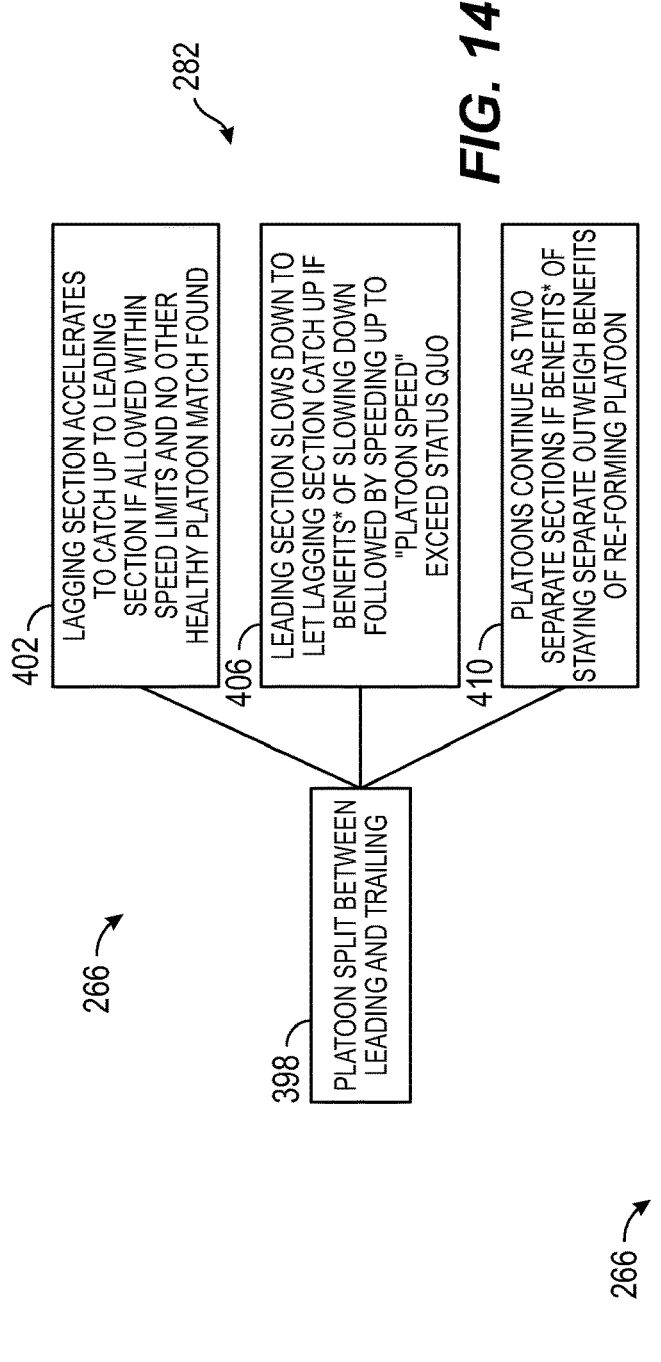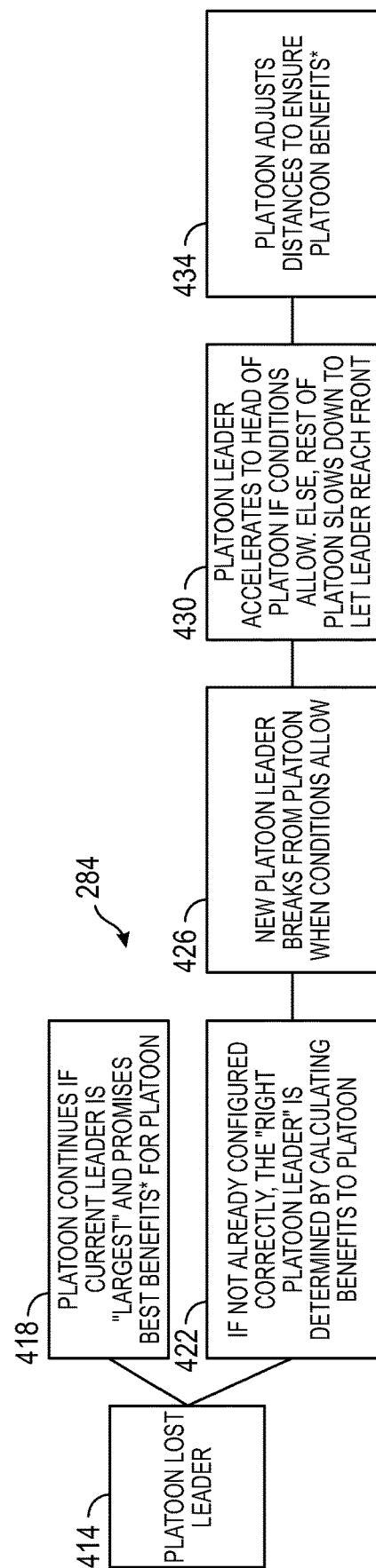

PLATOON SYSTEM FOR VEHICLES

CROSS-REFERENCE TO RELATED APPLICATIONS

The present application is a continuation of U.S. patent application Ser. No. 17/195,336, filed on Mar. 8, 2021, which is a continuation of U.S. patent application Ser. No. 16/173,264 filed on Oct. 29, 2018, which claims priority to U.S. Provisional Patent Application No. 62/579,733 filed on Oct. 31, 2017, each of which are incorporated herein by reference in their entireties.

TECHNICAL FIELD

The present disclosure relates to platoon management of vehicles. More particularly, the present disclosure relates to systems and methods for providing platoon aids for vehicle spacing.

BACKGROUND

The development of sensor and onboard controller technology, in addition to connectivity improvement with wireless networks has allowed vehicles to be connected together and share information. Vehicle technology improvements have led to the integration of automatic and semi-automatic vehicle driving features. The formation of vehicle platoons can provide improvements to vehicle travel. A platoon is a group of vehicles travelling together and allows for benefits including group sensing of environmental conditions (road conditions, grade, upcoming curves, eHorizon, weather, traffic), and drag reduction leading to improved fuel economy. Platooning provide an interlink between the vehicles included in the platoon so that they may be operated in closer proximity to one another. Current manually operated human machine interfaces and controls provide larger distances between vehicles than could potentially be achieved by an automated or semi-automated platoon system. For example, current trucking practices require an operator to provide at least a two second spacing to a leading vehicle. A platoon system could significantly reduce the separation between vehicles and provide significant fuel economy benefits.

SUMMARY

One embodiment relates to an apparatus that includes one or more processing circuits comprising one or more memory devices coupled to one or more processors, the one or more memory devices configured to store instructions thereon that, when executed by the one or more processors, cause the one or more processors to: determine at least one reason for a deserter to exit a first platoon; determine a deserter position within the first platoon; communicate the deserter exit to the first platoon after determination of the at least one reason for the deserter to exit the first platoon based at least in part on the deserter position; adapt a behavior of the first platoon to allow the deserter to exit the first platoon; and reconfigure the remaining vehicles from the first platoon into a second platoon.

Another embodiment relates to an apparatus that includes one or more processing circuits comprising one or more memory devices coupled to one or more processors, the one or more memory devices configured to store instructions thereon that, when executed by the one or more processors, cause the one or more processors to: determine at least one reason for a deserter to exit a first platoon; adapt a behavior of the first platoon to allow the deserter to exit the first platoon; and reconfigure the remaining vehicles from the first platoon into a second platoon.

Another embodiment relates to an apparatus that includes one or more processing circuits comprising one or more memory devices coupled to one or more processors, the one or more memory devices configured to store instructions thereon that, when executed by the one or more processors, cause the one or more processors to: determine a leader deserter position, a middle deserter position, or an end of platoon position of a deserter within the first platoon; adapt a behavior of the first platoon based on the deserter position to allow the deserter to exit the first platoon; and reconfigure the remaining vehicles from the first platoon into a second platoon.

These and other features, together with the organization and manner of operation thereof, will become apparent from the following detailed description when taken in conjunction with the accompanying drawings.

BRIEF DESCRIPTION OF THE FIGURES

FIG. 7 is a schematic representation of an initial platoon of vehicles according to some embodiments;

FIG. 8 is a schematic representation of an updated platoon of vehicles according to some embodiments;

FIG. 9 is a schematic representation of another initial platoon of vehicles according to some embodiments;

FIG. 14 is a flow chart representing a fourth step of the method of leaving the platoon of vehicles according to some embodiments; and FIG. 15 is a flow chart representing an alternate fourth step of the method of leaving the platoon of vehicles according to some embodiments.

DETAILED DESCRIPTION

Following below are more detailed descriptions of various concepts related to, and implementations of, methods, apparatuses, and systems for a platoon system for vehicles. The various concepts introduced above and discussed in greater detail below may be implemented in any number of ways, as the concepts described are not limited to any particular manner of implementation. Examples of specific implementations and applications are provided primarily for illustrative purposes.

Referring to the figures generally, the various embodiments disclosed herein relate to systems, apparatuses, and methods for a platoon system for vehicles that improves platooning capabilities and fuel efficiency of the platoon. More specifically, the platoon system collects data from a platoon of vehicles and uses that data to assign each vehicle a capability score (e.g., dependent on vehicle mass, braking capabilities). The capability scores are then used to determine a vehicle order or position and a vehicle spacing. Additionally, the platoon system provides an aid for exiting and/or entering the platoon of vehicles efficiently, and an override option for entering and/or exiting the platoon for a variety of reasons.

Figure 1:
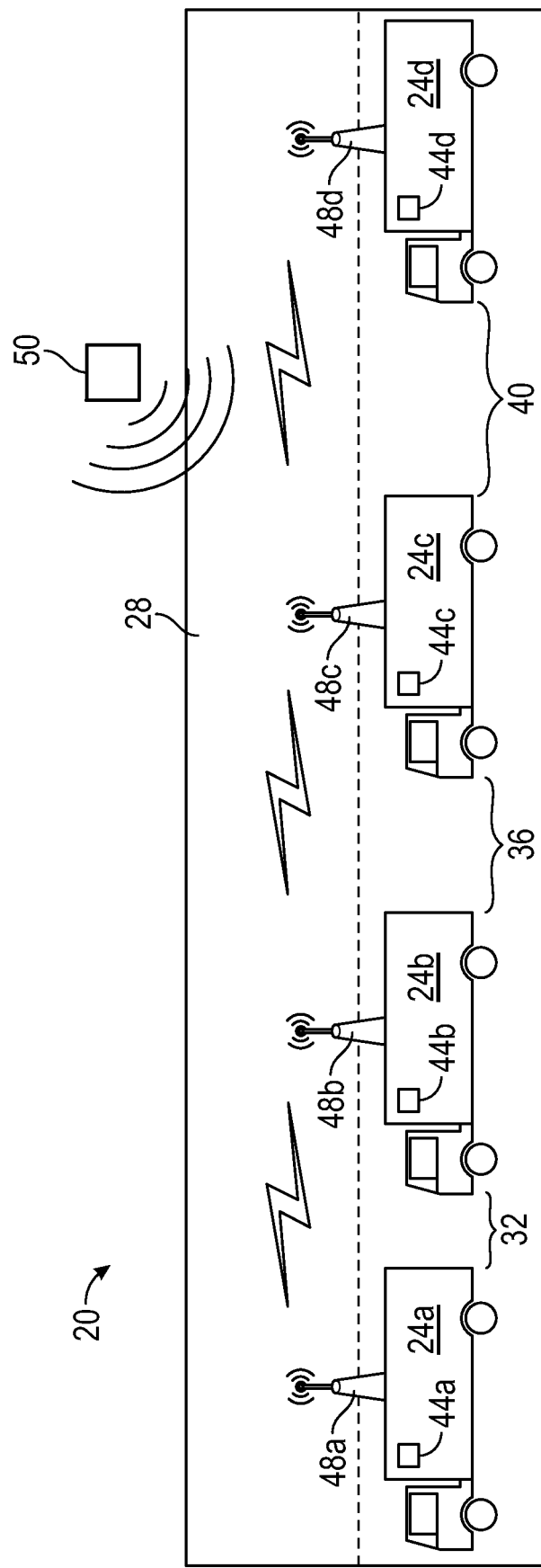
FIG. 1 is a schematic representation of a platoon of vehicles according to some embodiments.

As shown in FIG. 1, a platoon 20 includes a first vehicle 24a, a second vehicle 24b, a third vehicle 24c, and a fourth vehicle 24d. The vehicles 24a-d are shown travelling on a roadway 28. In some embodiments, the platoon 20 travels off-highway, or off-road. For example, the platoon 20 may travel in a quarry or a mine environment. While four vehicles 24a-d are shown, the platoon 20 can include any number of vehicles 24a-n. A first separation distance 32 is defined between the first vehicle 24a and the second vehicle 24b, a second separation distance 36 is defined between the second vehicle 24b and the third vehicle 24c, and a third separation distance 40 is defined between the third vehicle 24c and the fourth vehicle 24d. In some embodiments, the first separation distance 32, the second separation distance 36, and the third separation distance 40 are different and independently determined. In some embodiments, the first separation distance 32, the second separation distance 36, and the third separation distance 40 are all about equal and determined as a group or independently. In some embodiments, the vehicles 24a-d are trucks such as tractor trailers, passenger vehicles, industrial vehicles, or other vehicles, as desired.

Each vehicle 24a-d includes a sensor array 44a-d structured to detect vehicle weight, vehicle loss parameters, powertrain loss parameters, power capabilities, brake capabilities, state of accessories, current vehicle location, vehicle velocity, current sensing derate information on vehicle speed, global positioning system (GPS) coordinates, eHorizon information, and/or radar information. Other information may be detected by the sensor array 44a-d or some of the above listed inputs may be eliminated.

Each vehicle 24a-d includes a communication system 48a-d structured to receive inputs from the sensor arrays 44a-d, and communicate with other communication systems 48a-d in the platoon 20. In addition, each communication system 48a-d can communicate with a remote network, station, and/or a vehicle(s) outside the platoon 20 in the form of a controller 50.

Figure 2:
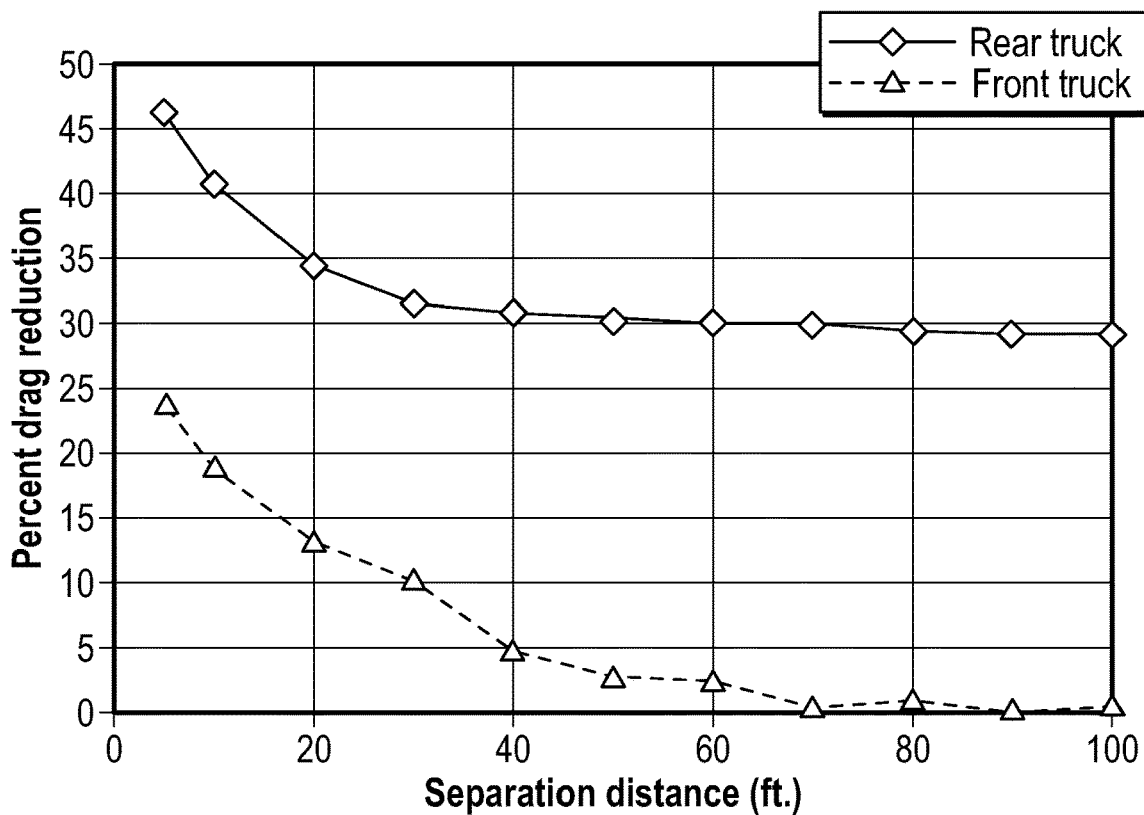
FIG. 2 is a graph showing a correlation between vehicle spacing and a reduction in drag according to some embodiments.
Figure 3:
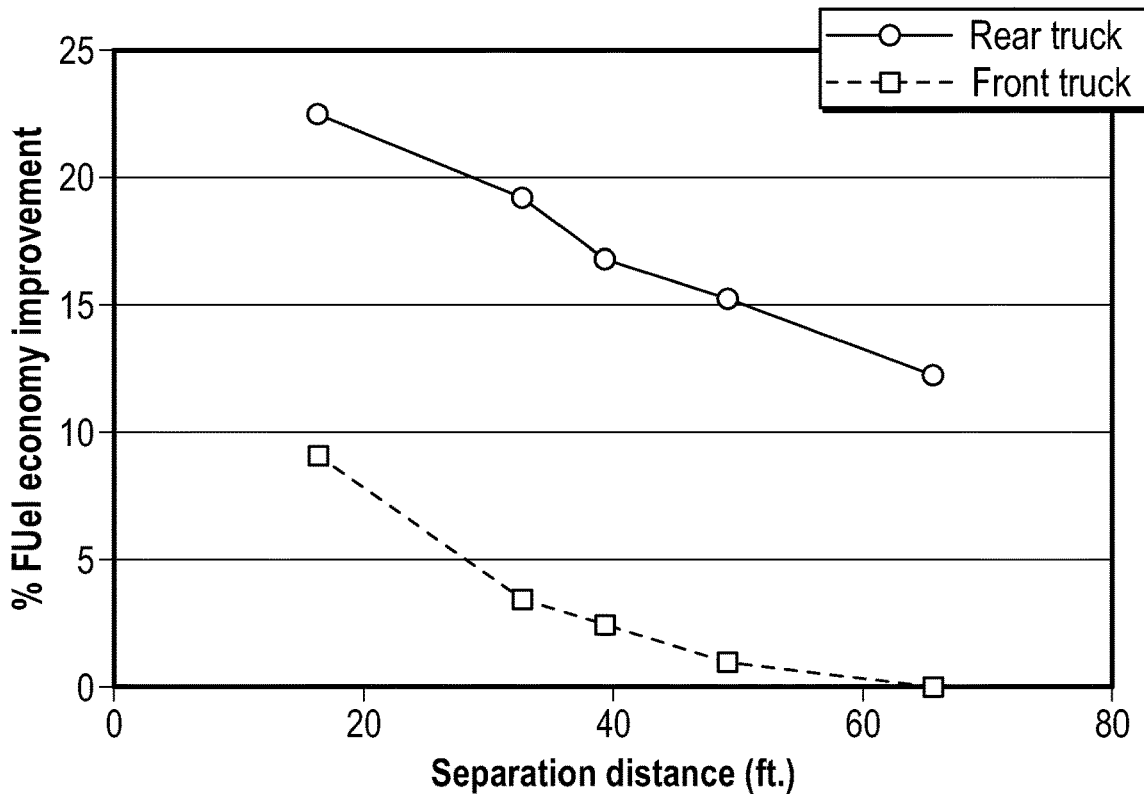
FIG. 3 is a graph showing a correlation between vehicle spacing and an increase in fuel efficiency according to some embodiments.

In some embodiments, the platoon 20 includes Class 8 Line Haul vehicles 24a-d. Heavy vehicles 24a-d present situations that limit the control formulations for automated or semi-automated driving. The vehicles 24a-d travel at significantly higher masses that typical passenger car vehicles (e.g., up to 80,000 lbs) and define larger dimensions (i.e., Class 8 Line Haul trucks are bigger than standard passenger vehicles). Due to their large size, these vehicles tend to gain significant fuel efficiency benefits typically when platooning behind other large vehicles (similar to their own size). As shown in FIG. 2, a percent drag reduction generally increases as the separation distance (e.g., the first separation distance 32) decreases. In other words, drag is reduced the closer together the vehicles 24a-d are to each other within the platoon 20. As a result, and as shown in FIG. 3, the fuel efficiency of a vehicle 24b-d increases when the separation distance decreases. In other words, the closer the spacing in the platoon 20, the better the fuel economy.

Given their masses, the Class 8 vehicles 24a-d have large stopping distances, along with the risk that variations in steering control may also create fishtailing (and in extreme cases, jack-knifing). The juxtaposition of the desire for short separation distances and the reality of large stopping distances provides a challenge to both achieve fuel economy benefits but also avoid getting too close to each other during slow down or stoppage events. The platoon 20 provides a system whereby the effects of powertrain associated capability variations and/or failures of one or more vehicles 24a-d in the platoon 20 are minimized.

Figure 4:
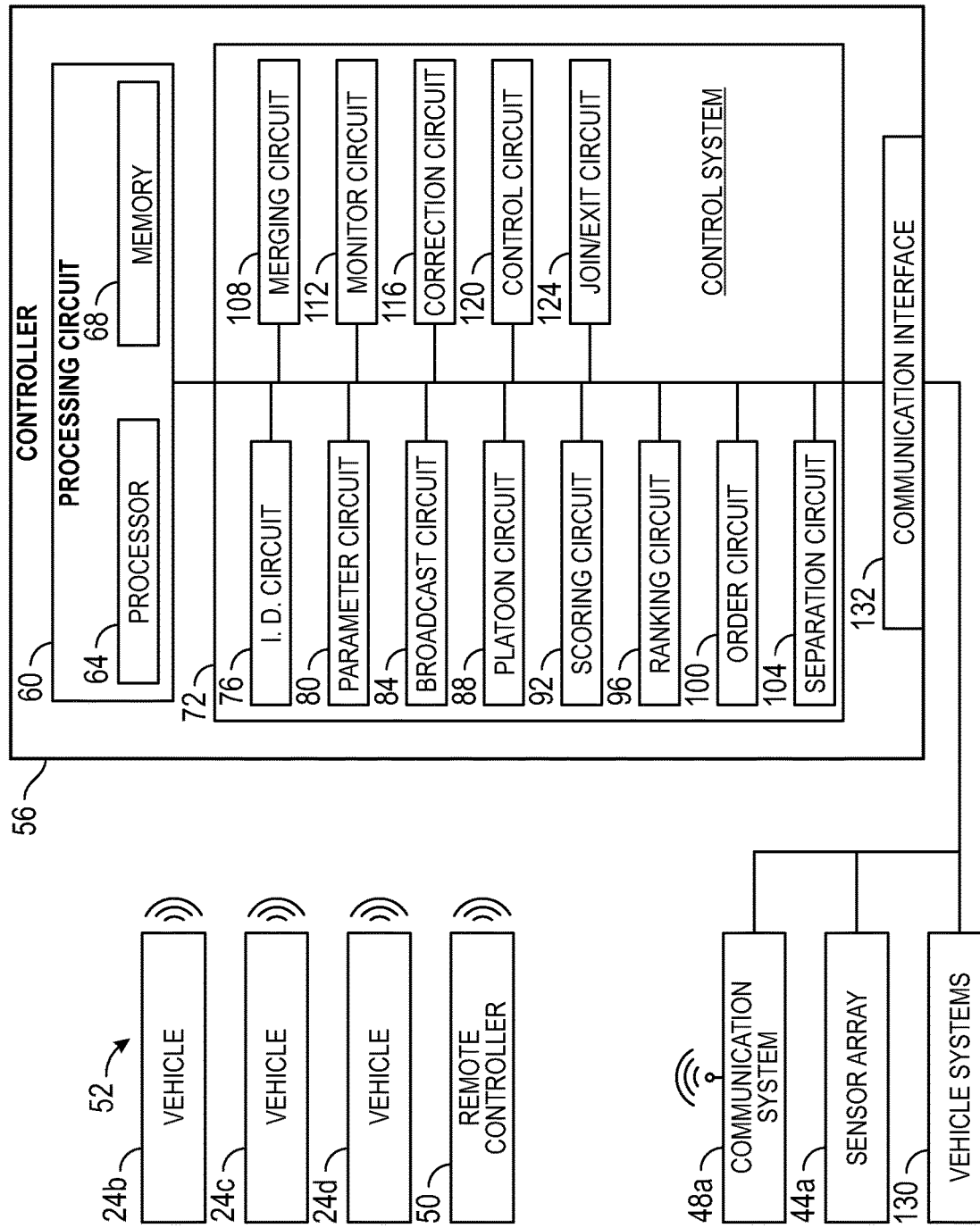
FIG. 4 is a schematic of a platoon control system for the platoon of vehicles shown in FIG. 1 according to some embodiments.

As shown in FIG. 4, a platoon control system 52 is structured to interact with the platoon 20 of vehicles 24a-d (e.g., heavy duty trucks) in three general steps. First, the platoon control system 52 identifies and communicates in real time the dynamic capabilities of each vehicle 24a-d and continually monitors the dynamic capabilities for changes. Dynamic capabilities include, but are not limited to, vehicle mass, power capability, powertrain/vehicle losses (e.g., drag, rolling resistance, inefficiencies), state of accessories, braking capability, impact of environment conditions (e.g., rain, snow, wind), sensing capability (e.g., vehicle speed, acceleration, eHorizon, GPS).

Second, the platoon control system 52 determines a platoon train order (i.e., the position of each vehicle 24a-d in the platoon 20) based on the dynamic capabilities (e.g., a vehicle 24a-d with lower transient capabilities could be located further behind in the platoon 20). In some embodiments, an increased probability of vehicle failure results in a rearward location in the determined platoon train order.

Third, the platoon control system 52 increases the separation distance or enacts a significant speed reduction based on the dynamic capability of a forward vehicle 24a-c in the platoon train order. For example, if the first vehicle 24a experiences an engine failure, a transmission failure, an axle failure, and/or a wheel/tire failure (etc.) the platoon control system 52 can increase the separation distances 36, and 40 and/or enact a speed reduction of the platoon 20 (e.g., each vehicle 24a-d reduces speed).

In addition to initial platoon train order, the platoon control system 52 can rearrange the platoon train order during transit. Rearrangement includes the movement of one vehicle 24a-d forward or backward in the platoon 20. Irrespective of the final location or position of the single vehicle 24a-d, rearrangement may be achieved by changing lanes (for the single vehicle 24a-d) and either accelerating or decelerating as compared to the platoon 20 and finding the right re-insertion point.

The components of FIG. 4 are shown to be associated with the vehicle 24a, and the platoon control system 52 includes a controller 56 structured as one or more electronic control units (ECU). The controller 56 may be separate from or included with at least one of a transmission control unit, an exhaust aftertreatment control unit, a powertrain control module, an engine control module, etc. The function and structure of the controller 56 is described in greater detail in FIG. 4. Although the controller 56 is described in relation to the first vehicle 24a, each vehicle in the platoon 20 (e.g., vehicles 24b-c) also includes a controller 56, as will be apparent in view of the following description.

Referring now to FIG. 4, a schematic diagram of the controller 56 of the vehicle 24a of FIG. 1 is shown according to an example embodiment. As shown in FIG. 4, the controller 56 includes a processing circuit 60 having a processor 64 and a memory device 68, a control system 72 having an identification circuit 76 for identifying each vehicle in the platoon 20, a parameter circuit 80 for receiving and processing inputs, a broadcast circuit 84 for packaging and communicating processed inputs, a platoon circuit 88 for receiving and processing communications from other vehicles in the platoon 20, a scoring circuit 92 for determining a vehicle score of each vehicle in the platoon 20 based on the processed inputs and received communications, a ranking circuit 96 for ranking the vehicle scores, an order circuit 100 for determining a platoon train order based on the ranking, a separation circuit 104 for determining separation distances between adjacent vehicles in the platoon 20, a merging circuit 108 for combining data from each vehicle in the platoon 20, a monitor circuit 112 for continually monitoring the platoon 20 for changes in any dynamic characteristics, a correction circuit 116 for enacting changes to the platoon train order and/or the separation distances, a control circuit 120 for controlling subsystems, actuators, or components of the vehicle 24a (generally designated vehicle systems 130), and a join/exit circuit 124 that controls entering and/or exiting the platoon 20 by the first vehicle 24a, another vehicle 24b-d, and/or a new vehicle, and a communications interface 132. Generally, the controller 56 is structured to communicate with the other vehicles 24b-c in the platoon 20, the remote controller 50, the environment, and other vehicles to determine a platoon train order and a separation distance for each vehicle 24a-d in the platoon 20. The controller 56 also controls entrance and exit from the platoon 20.

In one configuration, the identification circuit 76, the parameter circuit 80, the broadcast circuit 84, the platoon circuit 88, the scoring circuit 92, the ranking circuit 96, the order circuit 100, the separation circuit 104, the merging circuit 108, the monitor circuit 112, the correction circuit 116, the control circuit 120, and the join/exit circuit 124 are embodied as machine or computer-readable media that is executable by a processor, such as processor 64. As described herein and amongst other uses, the machine-readable media facilitates performance of certain operations to enable reception and transmission of data. For example, the machine-readable media may provide an instruction (e.g., command) to, e.g., acquire data. In this regard, the machine-readable media may include programmable logic that defines the frequency of acquisition of the data or transmission of the data. The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus).

In another configuration, the identification circuit 76, the parameter circuit 80, the broadcast circuit 84, the platoon circuit 88, the scoring circuit 92, the ranking circuit 96, the order circuit 100, the separation circuit 104, the merging circuit 108, the monitor circuit 112, the correction circuit 116, the control circuit 120, and the join/exit circuit 124 are embodied as hardware units, such as electronic control units. As such, the identification circuit 76, the parameter circuit 80, the broadcast circuit 84, the platoon circuit 88, the scoring circuit 92, the ranking circuit 96, the order circuit 100, the separation circuit 104, the merging circuit 108, the monitor circuit 112, the correction circuit 116, the control circuit 120, and the join/exit circuit 124 may be embodied as one or more circuitry components including, but not limited to, processing circuitry, network interfaces, peripheral devices, input devices, output devices, sensors, etc. In some embodiments, the identification circuit 76, the parameter circuit 80, the broadcast circuit 84, the platoon circuit 88, the scoring circuit 92, the ranking circuit 96, the order circuit 100, the separation circuit 104, the merging circuit 108, the monitor circuit 112, the correction circuit 116, the control circuit 120, and the join/exit circuit 124 may take the form of one or more analog circuits, electronic circuits (e.g., integrated circuits (IC), discrete circuits, system on a chip (SOCs) circuits, microcontrollers), telecommunication circuits, hybrid circuits, and any other type of "circuit." In this regard, the identification circuit 76, the parameter circuit 80, the broadcast circuit 84, the platoon circuit 88, the scoring circuit 92, the ranking circuit 96, the order circuit 100, the separation circuit 104, the merging circuit 108, the monitor circuit 112, the correction circuit 116, the control circuit 120, and the join/exit circuit 124 may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on). The identification circuit 76, the parameter circuit 80, the broadcast circuit 84, the platoon circuit 88, the scoring circuit 92, the ranking circuit 96, the order circuit 100, the separation circuit 104, the merging circuit 108, the monitor circuit 112, the correction circuit 116, the control circuit 120, and the join/exit circuit 124 may also include programmable hardware devices such as field programmable gate arrays, programmable array logic, programmable logic devices or the like. The identification circuit 76, the parameter circuit 80, the broadcast circuit 84, the platoon circuit 88, the scoring circuit 92, the ranking circuit 96, the order circuit 100, the separation circuit 104, the merging circuit 108, the monitor circuit 112, the correction circuit 116, the control circuit 120, and the join/exit circuit 124 may include one or more memory devices for storing instructions that are executable by the processor(s) of the identification circuit 76, the parameter circuit 80, the broadcast circuit 84, the platoon circuit 88, the scoring circuit 92, the ranking circuit 96, the order circuit 100, the separation circuit 104, the merging circuit 108, the monitor circuit 112, the correction circuit 116, the control circuit 120, and the join/exit circuit 124. The one or more memory devices and processor(s) may have the same definition as provided below with respect to the memory device 68 and processor 64. In some hardware unit configurations, the identification circuit 76, the parameter circuit 80, the broadcast circuit 84, the platoon circuit 88, the scoring circuit 92, the ranking circuit 96, the order circuit 100, the separation circuit 104, the merging circuit 108, the monitor circuit 112, the correction circuit 116, the control circuit 120, and the join/exit circuit 124 may be geographically dispersed throughout separate locations in the vehicle. Alternatively and as shown, the identification circuit 76, the parameter circuit 80, the broadcast circuit 84, the platoon circuit 88, the scoring circuit 92, the ranking circuit 96, the order circuit 100, the separation circuit 104, the merging circuit 108, the monitor circuit 112, the correction circuit 116, the control circuit 120, and the join/exit circuit 124 may be embodied in or within a single unit/housing, which is shown as the controller 56.

In the example shown, the controller 56 includes a processing circuit 60 having a processor 64 and a memory device 68. The processing circuit 60 may be structured or configured to execute or implement the instructions, commands, and/or control processes described herein with respect to identification circuit 76, the parameter circuit 80, the broadcast circuit 84, the platoon circuit 88, the scoring circuit 92, the ranking circuit 96, the order circuit 100, the separation circuit 104, the merging circuit 108, the monitor circuit 112, the correction circuit 116, the control circuit 120, and the join/exit circuit 124. The depicted configuration represents the identification circuit 76, the parameter circuit 80, the broadcast circuit 84, the platoon circuit 88, the scoring circuit 92, the ranking circuit 96, the order circuit 100, the separation circuit 104, the merging circuit 108, the monitor circuit 112, the correction circuit 116, the control circuit 120, and the join/exit circuit 124 as machine or computer-readable media. However, as mentioned above, this illustration is not meant to be limiting as the present disclosure contemplates other embodiments where the identification circuit 76, the parameter circuit 80, the broadcast circuit 84, the platoon circuit 88, the scoring circuit 92, the ranking circuit 96, the order circuit 100, the separation circuit 104, the merging circuit 108, the monitor circuit 112, the correction circuit 116, the control circuit 120, and the join/exit circuit 124, or at least one circuit of the identification circuit 76, the parameter circuit 80, the broadcast circuit 84, the platoon circuit 88, the scoring circuit 92, the ranking circuit 96, the order circuit 100, the separation circuit 104, the merging circuit 108, the monitor circuit 112, the correction circuit 116, the control circuit 120, and the join/exit circuit 124, is configured as a hardware unit. All such combinations and variations are intended to fall within the scope of the present disclosure.

The processor 64 may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the identification circuit 76, the parameter circuit 80, the broadcast circuit 84, the platoon circuit 88, the scoring circuit 92, the ranking circuit 96, the order circuit 100, the separation circuit 104, the merging circuit 108, the monitor circuit 112, the correction circuit 116, the control circuit 120, and the join/exit circuit 124 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory device 68 (e.g., RAM, ROM, Flash Memory, hard disk storage) may store data and/or computer code for facilitating the various processes described herein. The memory device 68 may be communicably connected to the processor 64 to provide computer code or instructions to the processor 64 for executing at least some of the processes described herein. Moreover, the memory device 68 may be or include tangible, non-transient volatile memory or non-volatile memory. Accordingly, the memory device 68 may include database components, object code components, script components, or any other type of information structure for supporting the various activities and information structures described herein.

The identification circuit 76 is structured to create a unique identification code for the first vehicle 24a and to communicate the unique identification code to the platoon 20 via the communication interface 132 and the communication system 48a. The identification circuit 76 is also structured to receive the unique identification codes from the other vehicles 24b-d in the platoon 20. The unique identification codes are stored in the memory device 68 and used by the platoon control system 52 to identify each vehicle 24a-d.

Figure 6:
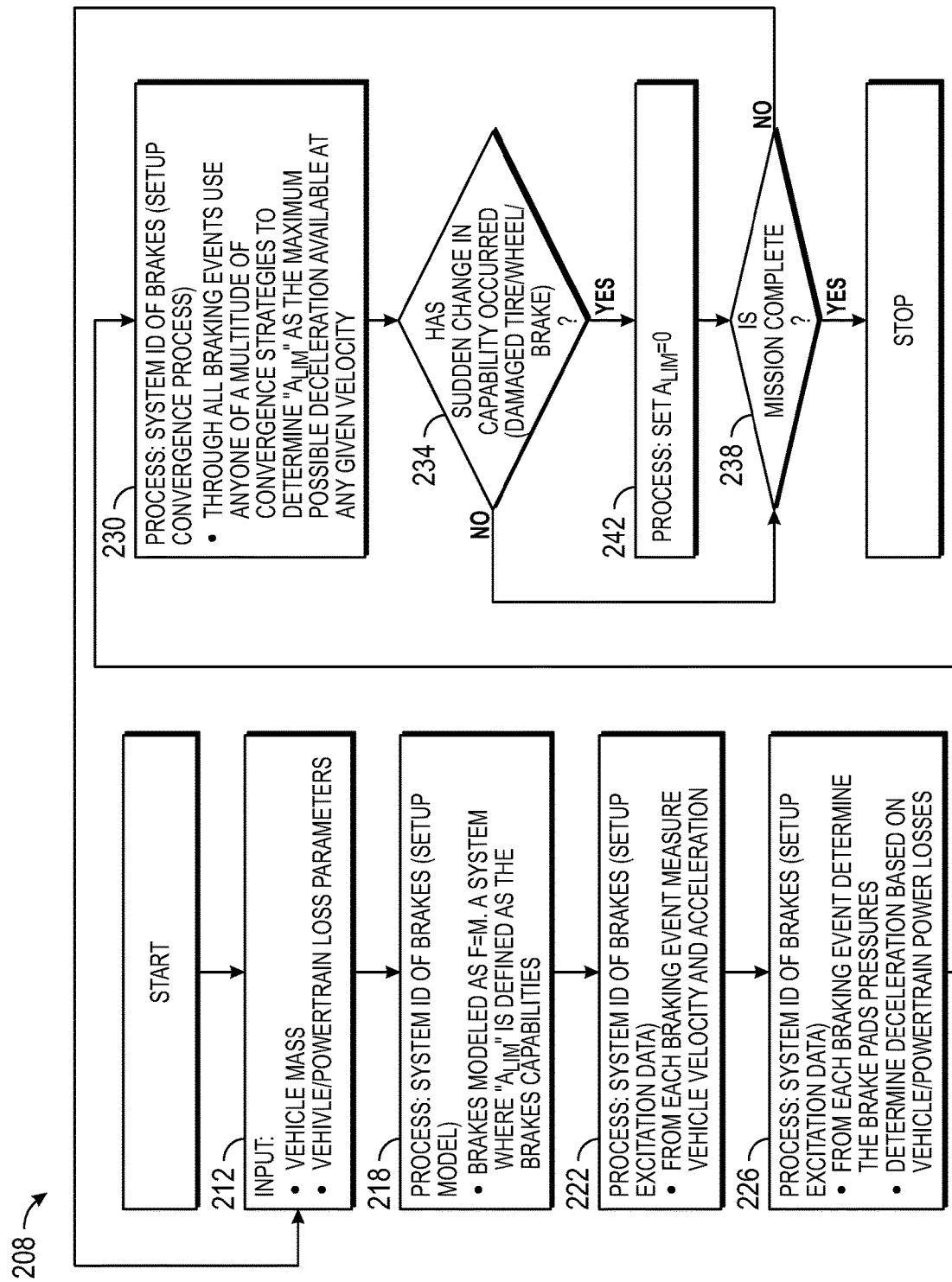
FIG. 6 is a flow chart representing a method of determining a braking capability of a vehicle in the platoon of vehicles shown in FIG. 1 and in accordance with the method shown in FIG. 5, according to some embodiments.

The parameter circuit 80 is structured to communicate with the sensor array 44a via the communications interface 132 to determine a current location (e.g., via GPS, lidar, inertial navigation, radar, or another location determination system), a velocity of the vehicle 24a, a mass of the vehicle 24a using a mass estimator algorithm based on stress sensor or other data indicative of vehicle mass, vehicle/powertrain loss parameters (e.g., drag, rolling resistance, inefficiencies), a power capability based on a current engine torque and power limits, a braking capability determined with brake system logic discussed below with reference to FIG. 6, a state of accessories, derate information on vehicle speed (e.g., a vehicle system 130 failure), an eHorizon status or upcoming event, etc. The parameter circuit 80 may use any of these inputs in any combination in addition to other inputs to determine parameters of the vehicle 24a.

The broadcast circuit 84 is structured to package the parameters determined by the parameter circuit 80 and communicate the parameters of the vehicle 24a to the other vehicles 24b-d in the platoon 20.

The platoon circuit 88 is structured to receive communication signals from the other vehicles 24b-d of the platoon 20 via the communication interface 132. The communication signals include the unique identification codes and packaged parameters from the other vehicles 24b-c.

The scoring circuit 92 is structured to receive the vehicle parameters of the first vehicle 24a from the parameter circuit 80, and the vehicle parameters of the other vehicles 24b-d from the platoon circuit 88 and to establish platooning capability scores for each vehicle 24a-d using a cost function. The cost function may be as simple as a weighted average of the various dynamic characteristics such that higher braking capabilities equate to a higher score, higher power capabilities equate to a higher score, greater vehicle and/or powertrain losses equate to a higher score, greater mass equates to a higher score, each sensing derate equates to a lower score, and/or each accessory derate equates to a lower score.

The ranking circuit 96 is structured to receive the scores from the scoring circuit 92 and rank the scores from highest to lowest.

The order circuit 100 is structured to receive the rank from the ranking circuit 96 and determine a position of each vehicle 24a-d in the platoon 20.

The separation circuit 104 is structured to receive the order from the order circuit 100 and to scale a separation distance for each vehicle 24a-d as a function of the platooning capability score determined by the scoring circuit 92 using a precalibrated reference table which sets nominal platooning distance for high scores and increases platooning distance for lower scores. In other words, vehicles with lower scores will not only be farther back in the platoon train order, but they will also have larger separation distance from vehicle in front.

The merging circuit 108 is structured to receive the scores, ranks, orders, and separation distances associated with each vehicle 24a-d from each of the vehicles 24a-d and merge that data to determine a worst-case scenario ranking for each vehicle 24a-d and produce a final rank order from the worst-case scenario ranks. In other words, each vehicle 24a-d shares and receives data from each other vehicle 24a-d and then the platoon 20 arrives at a final rank order cooperatively. The final rank order also includes a final separation distance for each vehicle 24a-d.

The monitor circuit 112 is structured to continually monitor all inputs and communications and determine if a change above a threshold score change and/or a threshold rank change has occurred. If a significant change is recognized, then the monitor circuit 112 is structured to send a change signal.

The correction circuit 116 is structured to receive the change signal and to communicate with the scoring circuit 92, the ranking circuit 96, the order circuit 100, the separation circuit 104, and the merging circuit 108 to determine an updated final rank order.

The control circuit 120 is structured to communicate with the vehicle systems 130 via the communication interface 132 to control operation of the vehicle 24a in accordance with the final rank order. In some embodiments, the control circuit 120 affects control over the brake system, the engine, the transmission, or another vehicle system 130.

The join/exit circuit 124 is structured to interact with the platoon circuit 88 and/or other circuits to indicate that the vehicle 24a, another vehicle 24b-d, or a new vehicle (not shown) will enter or exit the platoon 20. Various factors affecting when and/or why a vehicle enters or leaves the platoon 20 will be discussed below in further detail.

The communications interface 132 is structured to receive communications from the sensor array 44a, send and receive signals via the communication system 48a of the vehicle 24a, and the vehicle systems 130.

While various circuits with particular functionality are shown in FIG. 4, it should be understood that the platoon control system 52 may include any number of circuits for completing the functions described herein. For example, the activities and functionalities of the circuits 76, 80, 84, 88, 92, 96, 100, 104, 108, 112, 116, 120, and 124 may be combined in multiple circuits or as a single circuit. Additional circuits with additional functionality may also be included. Further, the platoon control system 52 may further control other activity beyond the scope of the present disclosure.

As mentioned above and in one configuration, the "circuits" may be implemented in machine-readable medium for execution by various types of processors, such as processor 64 of FIG. 4. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

Figure 5:
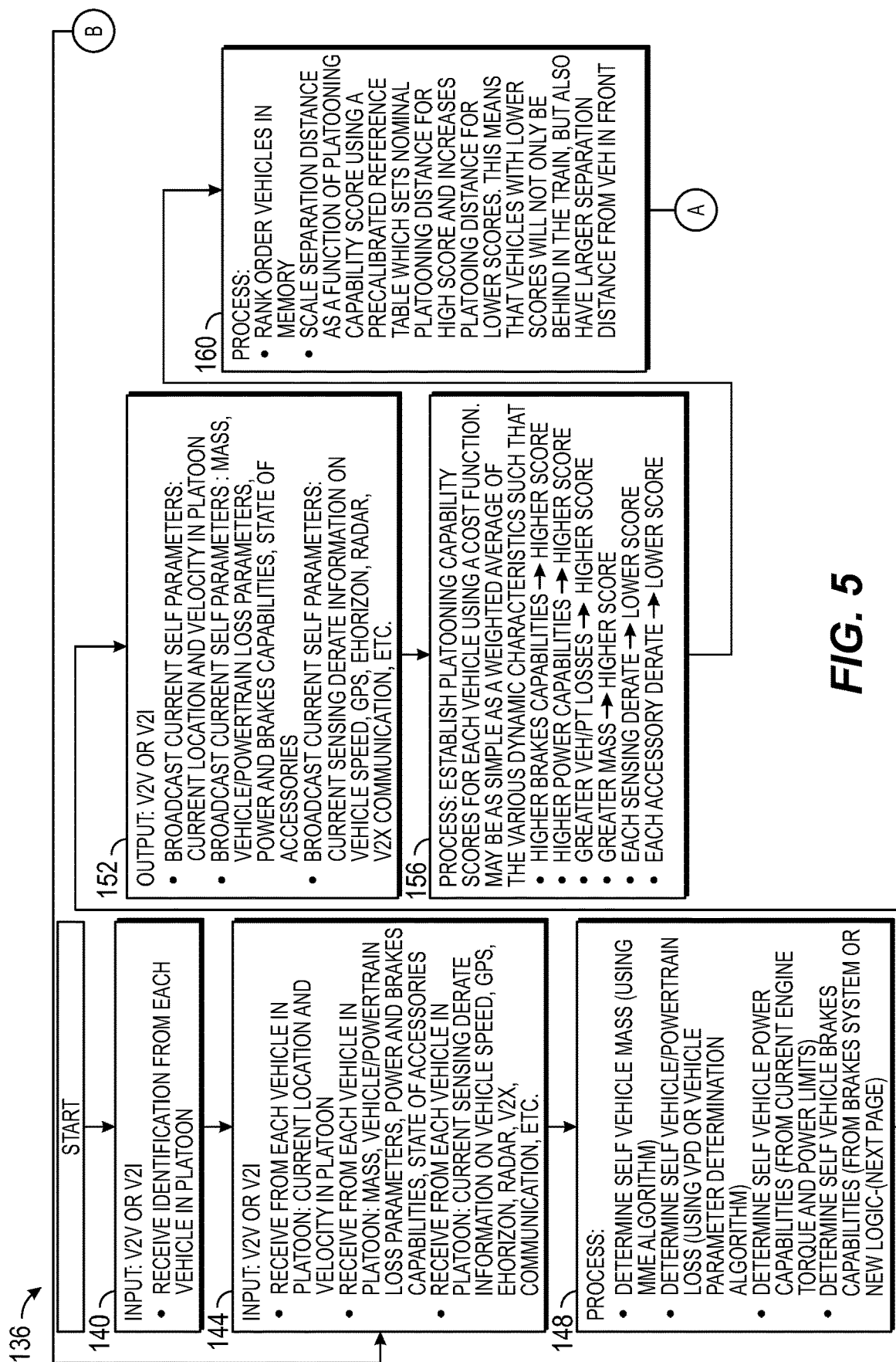
FIG. 5 is a flow chart representing a method of operating the platoon control system of FIG. 4 according to some embodiments.
Figure 5:
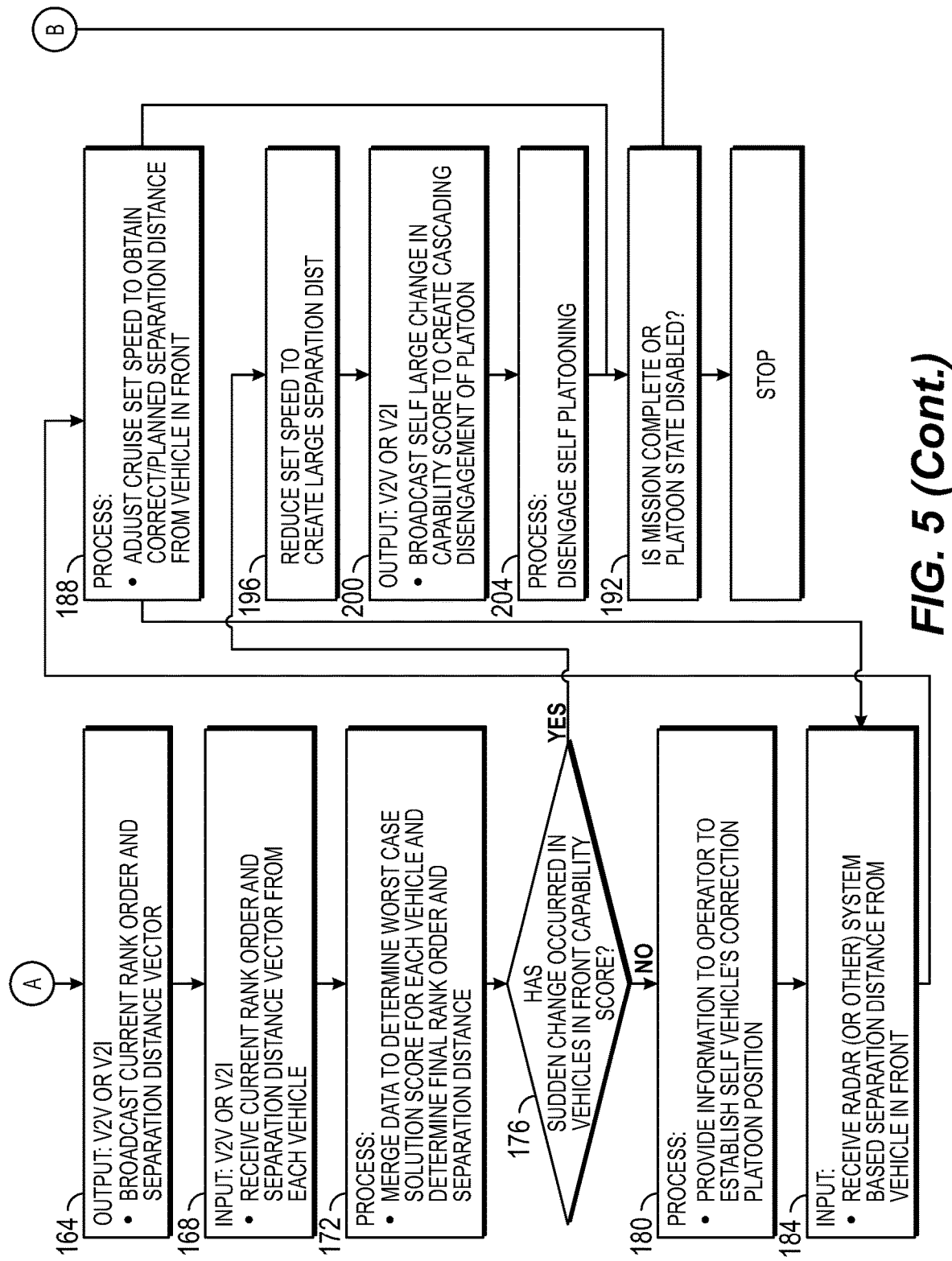

As shown in FIG. 5, a method 136 of ordering and spacing the platoon 20 includes receiving the unique identification codes of each vehicle 24a-d via the identification circuit 76 at step 140. At step 144, the parameter circuit 80 acquires the vehicle parameters of the first vehicle 24a and the platoon circuit 88 receives the vehicle parameters of the other vehicles 24b-d. At step 148, the parameter circuit 80 processes the data received and determines dynamic parameters of the first vehicle 24a including vehicle mass, vehicle and powertrain losses, power capabilities, and brake capabilities. At step 152, the broadcast circuit 84 communicates the dynamic parameters of the first vehicle 24a to the other vehicles 24b-d, and the other vehicles 24b-d communicate their dynamic parameters to the platoon circuit 88. At step 156, the scoring circuit 92 receives all the dynamic parameters of each vehicle 24a-d and assigns a score to each vehicle 24a-d. At step 160, the ranking circuit 96 receives the scores and determines a rank from largest score to smallest score of the vehicles 24a-d, and the order circuit 100 determines a platoon train order based on the rank. The separation circuit 104 utilizes each score to determine a separation distance for each vehicle 24a-d as a function of the score using a precalibrated reference table which sets a nominal platooning distance for a high score and increases the platooning distance for lower scores. At step 164, the broadcast circuit 84 communicates the ranks, order, and separation distances to the other vehicles 24b-d. At step 168, the platoon circuit 88 receives the ranks, order, and separation distances from the other vehicles 24b-d. At step 172, the merging circuit 108 merges all the received data to determine a worst-case score for each vehicle 24a-d and determines a final rank order and a final separation distance for each vehicle 24a-d. The final rank order and the final separation distances are communicated to all the vehicles 24a-d via the broadcast circuit 84. After step 172, the vehicles 24a-d continue in the platoon 20 at the determined final separation distances in the determined final rank order in order to provide a fuel efficiency advantage.

At step 176, during transit in the platoon 20, the monitor circuit 112 communicates with the scoring circuit 92, the ranking circuit 96, the order circuit 100, and the separation circuit 104, and receives data from the other vehicles 24a-d, the remote controller 50, and/or other vehicles to determine if a critical change has occurred. In some embodiments, a critical change includes a score, rank, order, or other dynamic parameter changing more than a threshold amount. In some embodiments, the monitor circuit 112 focuses on the dynamic parameters, score, or rank of the vehicles preceding the vehicle in the platoon train order. For example, the third vehicle 24c might monitor the score of the first vehicle 24a and the second vehicle 24b before monitoring its own score or the score of the fourth vehicle 24d. In some embodiments, giving priority to vehicles ahead in the platoon train order improves response time to score derating, slowing, or stopping events.

If the monitor circuit 112 determines that no critical change has occurred, the method 136 progresses to step 180 and the correction circuit 116 communicates the determined final rank order and the final separation distance to an operator of the vehicle 24a. In one example, the operator of the first vehicle 24a receives a final rank order of one (i.e. first in the platoon train order) indicating that the first vehicle 24a is the strongest leader, the operator of the second vehicle 24b receives a final rank order of two (i.e. second in the platoon train order) and a final separation distance 32 of about twenty feet (20 ft), the operator of the third vehicle 24c receives a final rank order of three (i.e. third in the platoon train order) and a final separation distance 36 of about thirty feet (30 ft), and the operator of the fourth vehicle 24d receives a final rank order of four (i.e. fourth in the platoon train order) and a final separation distance 40 of about thirty-five feet (35 ft).

At step 184, the control circuit 120 receives the final rank order and the final separation distance from the correction circuit 116, and receives location data from the parameter circuit 80. The location data is indicative of the current separation distance between adjacent vehicles. For example, the second vehicle 24b receives the current separation distance 32 between the second vehicle 24b and the first vehicle 24a, and the current separation distance 36 between the second vehicle 24b and the third vehicle 24c. At step 188, the control circuit 120 controls operation of the vehicle systems 130 to achieve the final separation distance. In some embodiments, the vehicle systems 130 include a cruise control that is adjusted to achieve the final separation distance between the target vehicle (e.g., the second vehicle 24b) and a leading vehicle (e.g., the first vehicle 24a). The method 136 continues to loop through steps 184 and 188 to maintain the final separation distances until the platoon's mission is complete, the target vehicle leaves the platoon 20, or the platoon 20 is disabled or disbanded at step 192. Simultaneously, while the method 136 is looping steps 184 and 188, the method 136 is also looping steps 144-176 to update dynamic platoon parameters and monitor for a critical change.

If the monitor circuit 112 determines at step 176 that a critical change has occurred, then the method proceeds to step 196 and a critical change command is communicated to the correction circuit 116. When the correction circuit 116 receives the critical change command, a predetermined critical change separation distance is set and communicated to the broadcast circuit 84 and sent to all vehicles 24a-d in the platoon 20 at step 200. The correction circuit 116 also determines a cascading disengagement order indicating which vehicles 24a-d should leave the platoon 20 and in what particular order. In some embodiments, the cascading disengagement order includes directional instructions (e.g., merge to left lane, exit next ramp, stop immediately, pull to roadside).

At step 204, the join/exit circuit 124 receives the cascading disengagement order and determines a disengagement routine including a rate of slowing and a merging strategy. The rate of slowing and merging strategy are communicated to the control circuit 116 in order to enact the cascading disengagement order and disengage from the platoon 20. When the last vehicle (e.g., the first vehicle 24a) disengages the platoon 20, the platoon state is deemed disabled at step 192 and the method 136 stops. Subsequently, a new platoon can be formed taking into account the new dynamic parameters after the critical change.

As shown in FIG. 6, in some embodiments, the parameter circuit 80 is structured to determine a braking capability using a method 208. The sensor array 44a includes a stress sensor or another sensor that is used by the parameter circuit 80 to determine an estimated vehicle mass, an accelerometer, a speed sensor, a brake pressure sensor, and other sensor. The parameter circuit 80 receives the inputs from at least the sensor array 44a and determines a vehicle mass, vehicle loss parameters, and powertrain loss parameters at step 212. At step 218, a brake system model is processed. The brake system model is based on a force as a function of mass and acceleration, and defines a brake capability acceleration $a_{LIM}$ as a variable. At step 222, the parameter circuit 80 receives inputs from the sensor array 44a indicative of the vehicle velocity and acceleration during each braking event and updates the brake system model. At step 226, the parameter circuit 80 receives inputs from the sensor array 44a indicative of brake pad pressures and a deceleration attributed to vehicle losses and/or powertrain losses, and updates the brake system model. At step 230, the parameter circuit 80 uses a convergence strategy to determine $a_{LIM}$ based on the brake system model, where $a_{LIM}$ represents the maximum deceleration possible at the current velocity of the vehicle 24a. At step 234, the parameter circuit 80 determines if a change in capability has occurred. In some embodiments, a change in capability includes a brake pad failure, a damaged tire, a damaged wheel, or another brake system component failure or breakdown. If no change in capability is determined at step 234, then the method 208 checks to see if the mission is complete at step 238. If the platoon 20 is still intact and the mission is ongoing, then the method returns to step 212 and continues to monitor the brake system. If a change in capabilities is determined at step 234, then the value of $a_{LIM}$ is set to zero at step 242 and a critical change is indicated by the monitor circuit 112 at step 176 of the method 136.

In some embodiments, the methods 136 and 208 focus on powertrain and vehicle state sensing related failures in a platooning system of heavy duty trucks on-highway. Significant to vehicle and or vehicle to infrastructure information exchange needs to occur at data rates sufficiently fast to manage failure events at platooning speeds and distances. Concepts of the methods 136 and 208 may be extended to not only failures of the powertrain, but also to other issues such as: introduction of foreign vehicle into platooning train; sudden onset of adverse conditions detected by some vehicles and not others (e.g., animal crossings, weather conditions, strong wind gusts, ice on road, on road constructions, emergency vehicle appearance); and planning the exit of one of the vehicles in the platoon by moving it to the back of the platoon train order in such a way to minimize the fuel consumption due to the disruption of the platoon (e.g., done sufficiently ahead of the exit and planned while making use of road terrain and traffic conditions and establishing a low capability measure for the exiting vehicle).

In addition to the methods 136 and 208, the platoon control system 52 provides capabilities for a vehicle to exit from a platoon on a line haul operation. Specifically, methods include steps a vehicle could follow for exiting a platoon and describe impacts of the vehicle departure on the platoon itself. In some embodiments, the platoon travels along an environment of highways or road systems that are populated with groups of platooning vehicles. As one of the vehicles chooses to leave the platoon to exit the road system/highway or join another platoon or drive individually, this decision must be communicated appropriately to other vehicles in the platoon. In some cases, a new platoon leader needs to be established. In other cases, some of the vehicles in the platoon have to speed up (or the others slow down) to appropriately re-form the platoon. Without proper communication, the platoon could end up with sub-optimal platooning benefits. Vehicles in a platoon account for braking capabilities of different vehicles in the platoon to plan for and execute the exit event. In some embodiments, a vehicle leaving a platoon is designated a deserter. In some embodiment, as shown in FIG. 7, a deserter 246 is positioned at an end of an initial platoon 250 on a roadway 254. The platoon control system 52 can plan for and execute a disengagement of the deserter 246 from the initial platoon 250 (e.g., the deserter 246 may exit the roadway 254 on an exit ramp 258). After the deserter 246 has exited the initial platoon 250, an updated platoon 262 continues to travel along the roadway 254 as shown in FIG. 8. In some embodiments, as shown in FIG. 9, the deserter 246 is not positioned at the end of the initial platoon 250 (e.g., the deserter in positioned in the middle of the initial platoon 250 or at the front of the initial platoon 250). The platoon control system 52 can plan for and execute a disengagement of the deserter 246 from the initial platoon 250 (e.g., the deserter 246 may exit the roadway 254 on an exit ramp 258). After the deserter 246 has exited the initial platoon 250, the updated platoon 262 continues to travel along the roadway 254 as shown in FIG. 8.

Generally, a method 266 for disengaging the deserter 246 from the initial platoon 250 includes a first step 270 including determining one or more reasons for the deserter 246 to exit the initial platoon 250 (see FIG. 10), an end-of-platoon second step 274 including determining an appropriate time to communicate to rest of the initial platoon 250 (see FIG. 11), an in-the-pack second step 276 including determining an appropriate time to communicate to rest of the initial platoon 250 (see FIG. 12), a third step 278 including adapting a behavior of the initial platoon 250 to allow safe exit of the deserter 246 (see FIG. 13), a platoon split fourth step 282 including reconfiguring remaining vehicles of the initial platoon 250 into the updated platoon 262 (see FIG. 14), and a lost leader fourth step 284 including reconfiguring remaining vehicles of the initial platoon 250 into the updated platoon 262 (see FIG. 15).

Figure 10:
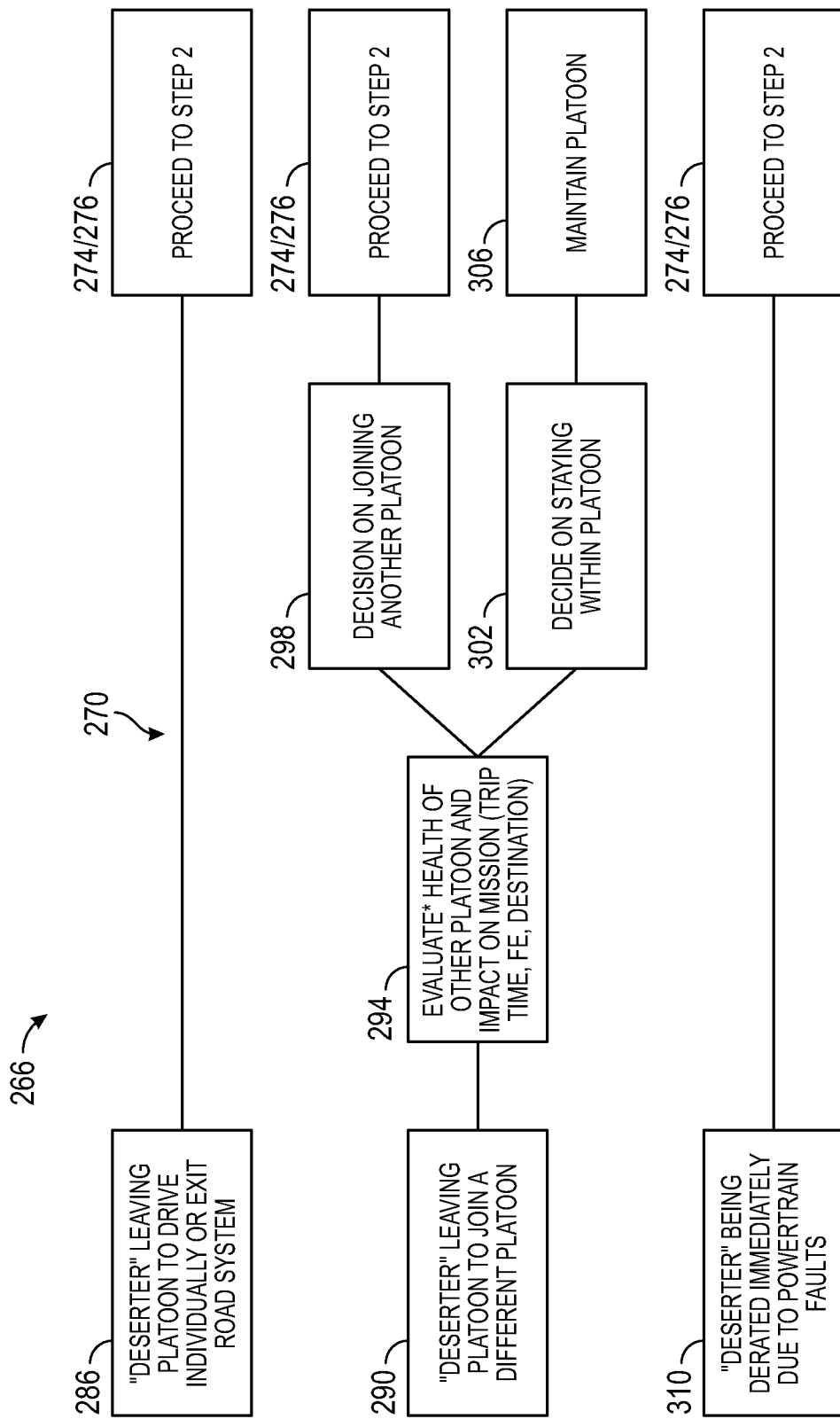
FIG. 10 is a flow chart representing a first step of a method of leaving a platoon of vehicles according to some embodiments.

As shown in FIG. 10, at the first step 270, the deserter 246 can choose to leave the initial platoon 250 to drive individually or to exit the road system at step 286. The determination to leave the initial platoon 250 can be made manually by an operator, or by the platoon control system 52. The deserter 246 can always independently disengage from the initial platoon 250 based on any number of conditions being satisfied. In some embodiments, conditions can include: the deserter 246 or the initial platoon 250 is within a certain distance from the exit 258, the deserter 246 decides that self-performance has suddenly deteriorated due to a fault (e.g., derate condition triggered, critical change determined), the fuel economy of the deserter 246 is adversely affected (even though the platoon fuel economy may be higher as a whole), a manual command from the operator, a determination that the travel speed of the initial platoon 250 is too slow for the deserter 246 (e.g., the deserter 246 has a time constraint for trip completion that cannot be met by being a part of the initial platoon (250). In some embodiments, each vehicle in the initial platoon 250 calculates the time it will require to complete the rest of the trip in the platoon and compare it against the time constraint it is operating under. If a vehicle determines they must leave the initial platoon 250, that vehicle becomes a deserter 246.

The initial platoon 250 collectively or a centralized supervisor (e.g., the remote controller 50) can decide to force the deserter 246 out of the initial platoon 250. In some embodiments, the deserter 246 is forced out of the initial platoon 250 if the supervisor determines that the deserter 246 has a performance characteristic that adversely affects the optimal value of a cost function (e.g., fuel economy, fluid economy with or without constraints like trip times) if the deserter 246 continues in the initial platoon 250. In some embodiments, the supervisor monitors platoon fueling and uses models to determine how the initial platoon 250 would be affected if any one vehicle is absent from the initial platoon 250. The supervisor could then send a command to the "weak" vehicle to be a deserter 246 and exit the initial platoon 250. In some embodiments, the deserter 246 is forced out of the initial platoon 250 if the performance of the deserter 246 does not match the expected performance from the model of the deserter 246 and the supervisor concludes that the deserter 246 should exit the initial platoon 250. For example, if the expected fueling for a given duty cycle is X grams of fuel and a vehicle in the initial platoon 250 reports much higher or lower fueling (e.g., 5%, 10%, 20% higher or lower), then that the particular vehicle is not operating as intended and may skew the optimization results. Therefore, the offending vehicle is identified as a deserter 246 and is removed from the initial platoon 250.

In some embodiments, the deserter 246 disengages from the initial platoon 250 if: the weather quality is below a pre-specified threshold (e.g., rain, snow, slippery roads) because, for example, radar may not work well; the terrain is too hilly/rough and the vehicles are dissimilar enough in performance that the overall performance of all vehicles is affected; the initial platoon 250 is entering a construction site; traffic factors negatively affect the initial platoon 250; regulations disallow or prohibit platooning (e.g., school zones, hospital zones etc.); and/or the platoon is leaving a geographic region (e.g., a geofenced area) allowing platooning or entering a geographic area that prohibits platooning.

Alternatively, the deserter 246 can leave the initial platoon 250 to join a different platoon (i.e., a second platoon) at step 290. At step 294, the deserter 246 evaluates a health of the second platoon and the second platoon's impact on the mission of the deserter 246 (e.g., trip time, fuel economy, destination). If the health of the second platoon is acceptable, then the decision to desert the initial platoon 250 is made and the deserter joins the second platoon at step 298. The second platoon could be engaged if geofencing indicates that the second platoon is allowed or required in a section of roadway that the deserter 246 will be travelling, the second platoon is travelling along open highways, and/or suitable environmental conditions exist for the second platoon (e.g., good weather, flat terrain). If the health of the second platoon is not acceptable or does not improve the deserter's 246 goals, then the decision to stay with the initial platoon 250 is made at step 302 and the deserter 246 removes the deserter designation and continues along with the initial platoon 250 at step 306.

Alternatively, the deserter 246 can leave the initial platoon 250 if the deserter 246 is derated due to a powertrain fault, or another critical change in a dynamic parameter at step 310. For example, if the engine fails, or a tire blows, the deserter 246 could be removed from the initial platoon 250. If the deserter 246 leaves the initial platoon 250 at any of steps 286, 298, or 310, the method 266 progresses to either the end-of-platoon second step 274 or the in-the-pack second step 276.

Figure 11:
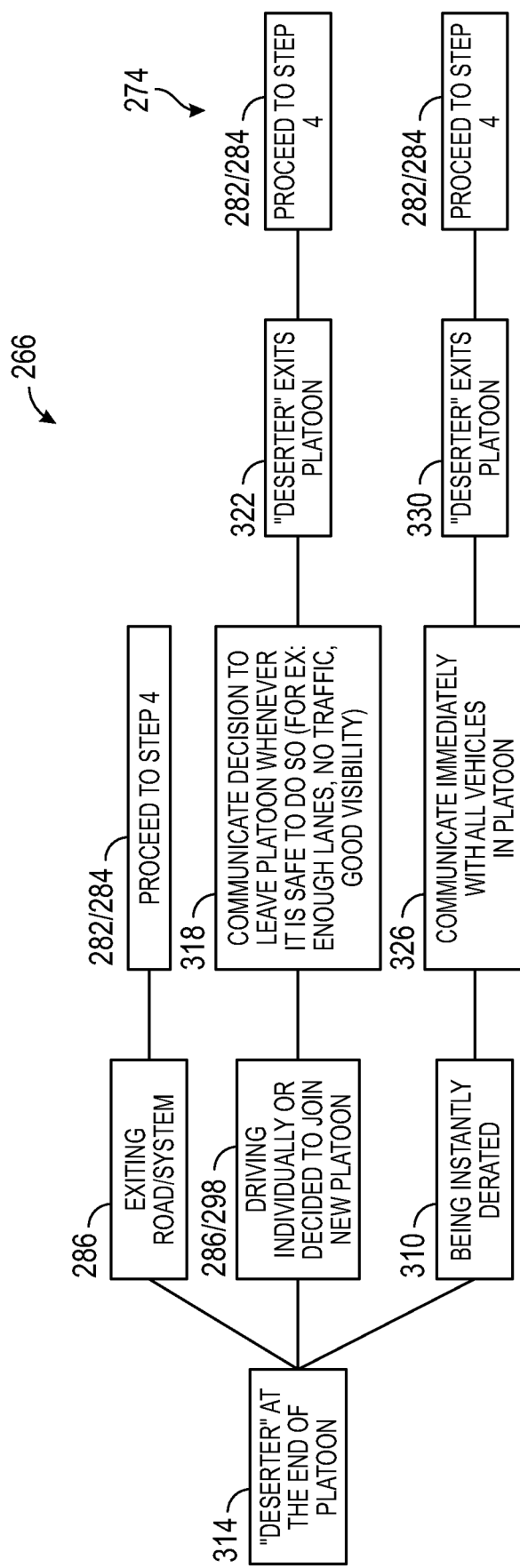
FIG. 11 is a flow chart representing a second step of the method of leaving the platoon of vehicles according to some embodiments.

The end-of-platoon second step 274 is shown in FIG. 11 and includes identifying that the deserter 246 is in an end position in the platoon train rank order at step 314. If the deserter 246 chose to leave the initial platoon 250 and exit the roadway at step 286, then the method 266 proceeds directly to the fourth step 282. If the deserter 246 chose to leave the initial platoon 250 at step 286 or chose to join the second platoon at step 298, then the decision to leave the initial platoon 250 is communicated to the other vehicles of the initial platoon 250 at step 318 when it is safe to do so (e.g., enough lanes are available, no traffic blockages exist, the weather is fair). After the communication is sent, the deserter 246 exits the initial platoon 250 at step 322 and the method 266 proceeds to the fourth step 282. If the deserter is being derated at step 310, then a communication is sent to the other vehicles in the initial platoon 250 immediately at step 326 and the deserter 246 exits the initial platoon 250 immediately at step 330. The method 266 then proceeds to the fourth step 282.

Figure 12:
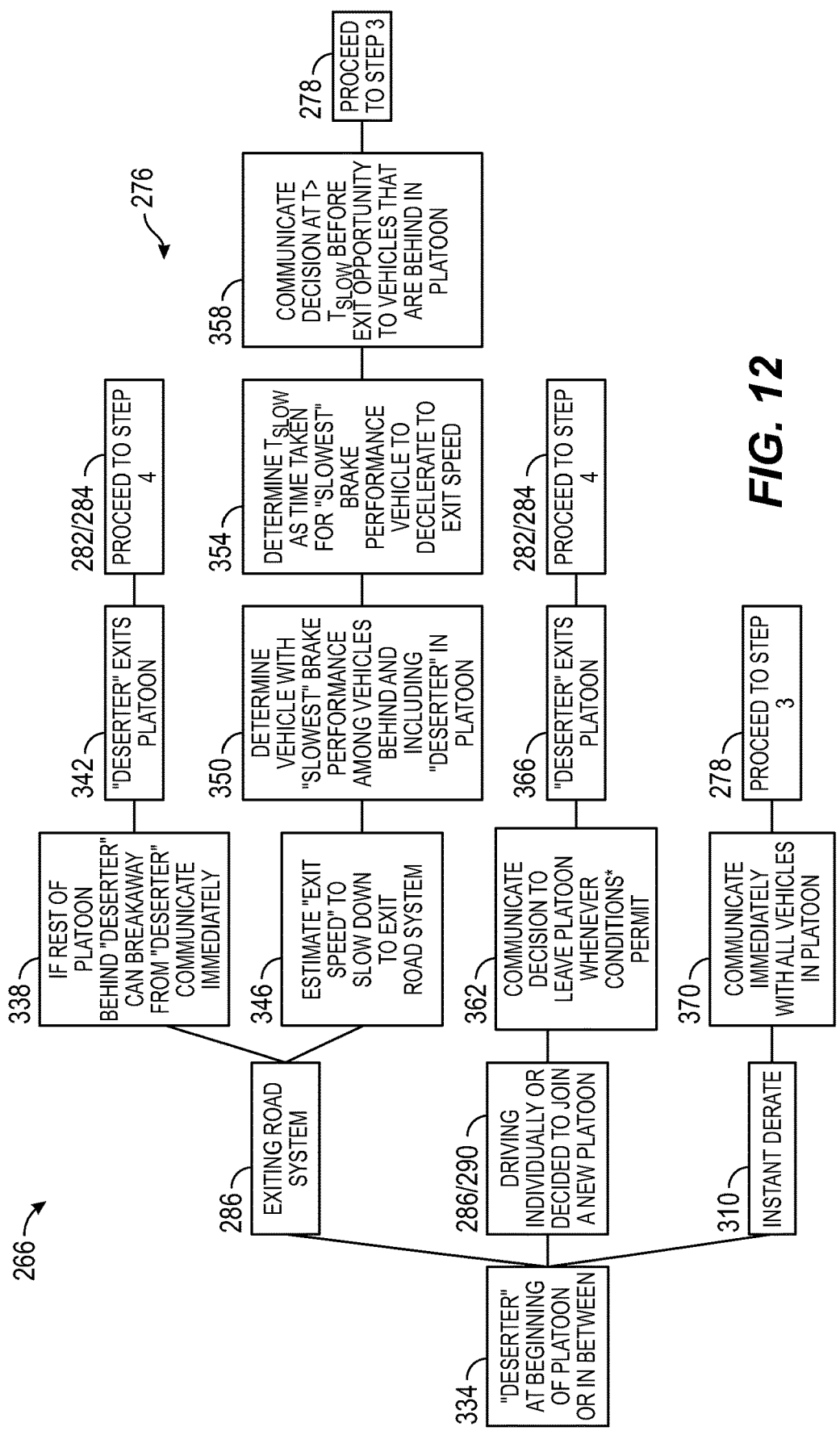
FIG. 12 is a flow chart representing an alternate second step of the method of leaving the platoon of vehicles according to some embodiments.

The in-the-pack second step 276 is shown in FIG. 12 and includes identifying that the deserter 246 is not at the end position in the platoon rank order at step 334. If the deserter 246 chose to leave the initial platoon 250 and exit the roadway at step 286, then the platoon control system 52 determines if the vehicles behind the deserter 246 in the initial platoon 250 can break away from the deserter 246. If the other vehicles can break away, then a communication is sent immediately at step 338 and the deserter 246 exits the roadway 258 at step 342. The method 266 then proceeds to the fourth step 282. If the other vehicles cannot break away, then an exit speed is calculated at step 346. The exit speed is determined by speed limits, exit ramp conditions and limitations, and/or vehicle factors such as weight, braking capability, etc. At step 350 the platoon control system 52 determines the vehicle with the slowest brake capabilities among the vehicles behind the deserter 246, and in some cases, also including the deserter 246. In some embodiments, the step 350 identifies the vehicle with the lowest score or rank. At step 354, a braking time $t_{slow}$ is determined and defined as the time predicted for the slowest vehicle to decelerate to the exit speed. At step 358, the communication that the deserter 246 will exit is sent to the other vehicles at a time greater than the braking time before the exit is reached. After the communication is sent at step 358, the method 266 proceeds to the third step 278.

With continued reference to FIG. 12, if the deserter 246 chose to leave the initial platoon 250 at step 286 or chose to join the second platoon at step 298, then the decision to leave the initial platoon 250 is communicated to the other vehicles of the initial platoon 250 at step 362 when it is safe to do so (e.g., enough lanes are available, no traffic blockages exist, the weather is fair). After the communication is sent, the deserter 246 exits the initial platoon 250 at step 366 and the method 266 proceeds to the fourth step 282. If the deserter is being derated at step 310, then a communication is sent to the other vehicles in the initial platoon 250 immediately at step 370 and the deserter 246 exits the initial platoon 250 immediately and the method 266 proceeds to the third step 278.

Figure 13:
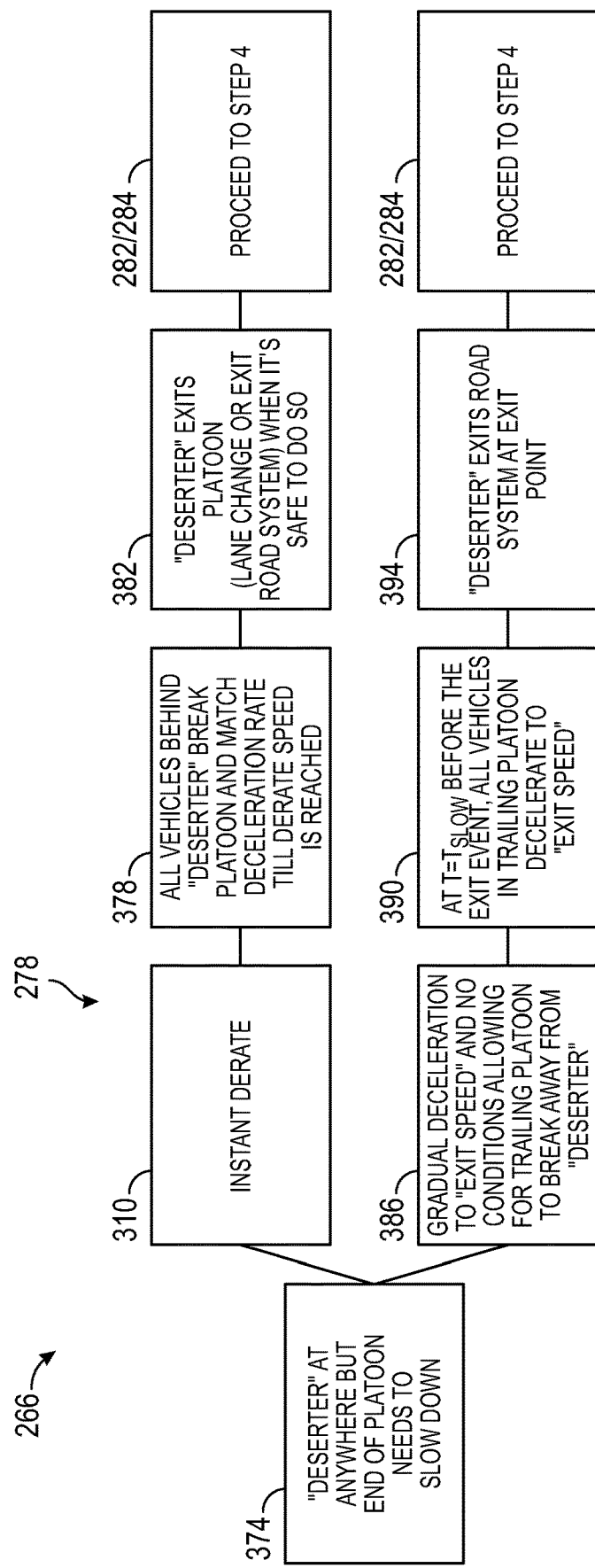
FIG. 13 is a flow chart representing a third step of the method of leaving the platoon of vehicles according to some embodiments.

The third step 278 is shown in FIG. 13 and includes recognizing that the deserter 246 is not in the end position of the platoon rank order at step 374. If the deserter 246 was derated at step 310, then all vehicles following the deserter 246 in the initial platoon 250 break away from the initial platoon 250 and match deceleration rates at step 378 until a derate speed is reached. The deserter 246 then exits the initial platoon 250 at step 382 and the method 266 proceeds to the fourth step 282. If the deserter 246 was not derated at step 310 and no opportunity exists for the other vehicles to break away from the deserter 246 (e.g., change lanes), then a deceleration rate is set at step 386. At step 390, all vehicles behind the deserter 246 decelerate to the exit speed starting at the braking time $t_{slow}$ before the exit 258. At step 394, the deserter 246 exits the roadway 254 and the method 266 proceeds to the fourth step 282.

The platoon split fourth step 282 is shown in FIG. 14 and includes determining that the deserter 246 has left from a position that is not the leader or the end of the platoon rank order at step 398 and a leading section is identified ahead of the vacated position of the deserter 246 and a lagging section is identified behind the vacated position of the deserter 246. At step 402, the lagging section accelerates to catch up to the leading section if allowed within the speed limit of the roadway 254 and not inhibited by the platoon control system 52. Additionally, if a second platoon is identified and is more advantageous, the lagging section may choose to join the second platoon and leave the initial platoon 250.

At step 406, the leading section slows down or decelerates to allow the lagging section to catch up if the platoon control system 52 determines that the benefits (e.g., fuel economy, trip time, performance benefits) of slowing down and reaccelerating to platoon speed to rejoin the lagging group exceed the status quo. At step 410, the initial platoon 250 continues as two separated sections if the benefits of staying separate exceed the benefits of adjusting speeds to rejoin.

The lost leader fourth step 284 is shown in FIG. 15 and includes determining that the deserter 246 has left from the leader position. At step 418, if the updated platoon 262 determines that the new leader is the largest or has the highest score or rank of the remaining vehicles, then the platoon rank order is maintained. At step 422, the platoon control system 52 determines that the current platoon rank order is not ideal and the method 136 is used to determine a new platoon rank order. At step 426, the vehicles of the updated platoon 262, including the new leader, break away when conditions allow (e.g., open lanes). At step 430, the new leader accelerates into the lead position, or the remaining vehicles decelerate to fall behind the new leader. At step 434, each vehicle in the updated platoon 262 adjusts speed to achieve the updated final separation distances, and the updated platoon 262 continues down the roadway 254.

In some embodiments, there could be other reasons for the deserter 246 to exit the initial platoon 250 including that the initial platoon 250 votes the deserter 246 off the initial platoon 250 due to negative impact to health of the initial platoon 250, and/or there is a change in mission critical parameters for the deserter 246 (e.g., a call for a faster trip time, a need to regenerate an aftertreatment system).

When the initial platoon 250 or individual vehicles decelerate voluntarily, another option is to use an intelligent coasting manager to extend service brake life while decelerating and increasing fuel efficiency. Time to slow down to "exit speed" should be calculated taking a variety of factors into account including the vehicle weight, braking capability, powertrain parameters, road characteristics, initial and exit speed into account.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
   one or more processing circuits comprising one or more memory devices coupled to one or more processors, the one or more memory devices configured to store instructions thereon that, when executed by the one or more processors, cause the one or more processors to:
   receive a parameter regarding operation of a first vehicle of a first platoon, the parameter comprising at least a fuel economy of the first vehicle;
   compare the parameter to a first predetermined threshold comprising at least a predetermined fuel economy value;
   responsive to determining that the parameter satisfies the first predetermined threshold, determine an exit parameter for the first vehicle, wherein determining that the parameter satisfies the first predetermined threshold is responsive to the fuel economy of the first vehicle being at or below the predetermined fuel economy value; and
   cause the first vehicle to exit the first platoon based on the exit parameter.

2. The apparatus of claim 1, wherein the exit parameter includes: a) the first vehicle exiting the first platoon to drive individually or exit a road system, b) the first vehicle exiting the first platoon to join a different platoon, or c) the first vehicle exiting the first platoon in response to a powertrain fault.

3. The apparatus of claim 1, wherein the one or more memory devices are further configured to store instructions thereon that, when executed by the one or more processors, cause the one or more processors to:
   evaluate a health of a second platoon; and
   cause the first vehicle to exit the first platoon and join the second platoon when the health of the second platoon meets a second threshold.

4. The apparatus of claim 1, wherein the parameter further comprises a vehicle speed of the first vehicle and the first predetermined threshold further comprises a minimum vehicle speed such that the parameter comprising the vehicle speed of the first vehicle satisfies the first predetermined threshold comprising the minimum vehicle speed when the vehicle speed of the first vehicle is less than the minimum vehicle speed.

5. The apparatus of claim 1, wherein the first predetermined threshold further comprises a predefined adverse weather condition such that the parameter further satisfies the first predetermined threshold when the parameter comprises at least one of a rainy weather condition or a snowy weather condition.

6. The apparatus of claim 1, wherein the parameter further comprises a road grade and the first predetermined threshold further comprises maximum road grade or maximum change in the road grade such that the parameter comprising the road grad satisfies the first predetermined threshold comprising the maximum road grade or maximum change in the road grade when the road grade is less than the maximum road grade or a change in the road grade is less than the maximum change in the road grade.

7. The apparatus of claim 1, wherein the parameter further comprises a location of the first platoon and the first predetermined threshold further comprises a predetermined distance between the location of the first platoon and a predetermined geolocation such that the parameter comprising the location of the first platoon satisfies the first predetermined threshold comprising the predetermined distance between the location of the first platoon and the predetermined geolocation when the location of the first platoon is less than the predetermined distance away from the predetermined geolocation or when the first platoon is within the predetermined geolocation.

8. The apparatus of claim 1, wherein the parameter further comprises a traffic condition of the first platoon and the first predetermined threshold further comprises a maximum traffic value such that the parameter comprising the traffic condition satisfies the first predetermined threshold comprising the maximum traffic value when the traffic condition is greater than the maximum traffic value.

9. The apparatus of claim 1, wherein the parameter further comprises a location of the first vehicle and the first predetermined threshold further comprises a minimum distance between the location of the first vehicle and a road exit such that the parameter comprising the location of the first vehicle satisfies the first predetermined threshold comprising the minimum distance between the location of the first vehicle and the road exit when the location of the first vehicle is less than the minimum distance away from the road exit.

10. The apparatus of claim 1, wherein the one or more memory devices are further configured to store instructions thereon that, when executed by the one or more processors, cause the one or more processors to:
receive a position of the first vehicle within the first platoon;
determine, based on the position of the first vehicle and the exit parameter, a time to communicate with one or more vehicles of the first platoon;
determine, based on the position of the first vehicle, an exit speed for the first vehicle; and
reconfigure the remaining vehicles from the first platoon into a second platoon, wherein reconfiguring the remaining vehicles from the first platoon into the second platoon includes causing an acceleration of a lagging section to catch up to a leading section.

11. The apparatus of claim 10, wherein the exit parameter includes the first vehicle being derated,
wherein reconfiguring the remaining vehicles from the first platoon into the second platoon includes forming the second platoon to include at least some of the vehicles positioned behind the first vehicle.

12. The apparatus of claim 10, wherein reconfiguring the remaining vehicles from the first platoon into the second platoon includes causing a deceleration of the leading section to allow the lagging section to catch up.

13. The apparatus of claim 10, wherein reconfiguring the remaining vehicles from the first platoon into the second platoon includes forming the second platoon from the leading section and a third platoon from the lagging section.

14. A method for disengaging a first vehicle from a first platoon, the method comprising:
receiving, by a controller, a parameter regarding operation of the first vehicle, the parameter comprising at least a fuel economy of the first vehicle;
comparing, by the controller, the parameter to a predetermined threshold comprising at least a predetermined fuel economy value;
determining, by the controller, an exit parameter for the first vehicle responsive to determining that the parameter satisfies the predetermined threshold based on the fuel economy of the first vehicle being at or below the predetermined fuel economy value; and
causing, by the controller, the first vehicle to exit the first platoon based on the exit parameter.

15. The method of claim 14, wherein the parameter further comprises a vehicle speed of the first vehicle and the predetermined threshold further comprises a minimum vehicle speed such that the parameter comprising the vehicle speed of the first vehicle satisfies the predetermined threshold comprising the minimum vehicle speed when the vehicle speed of the first vehicle is less than the minimum vehicle speed, and wherein the minimum vehicle speed is determined based on a time constraint of the first vehicle.

16. The method of claim 14, wherein the parameter further comprises a road grade and the predetermined threshold further comprises a maximum road grade or a maximum change in the road grade such that the parameter comprising the road grade satisfies the predetermined threshold comprising the maximum road grade or the maximum change in the road grade when the road grade is greater than the maximum road grade or a change in the road grade is greater than the maximum change in the road grade.

17. A non-transitory computer-readable storage media having instructions stored thereon that, when executed by at least one processor, cause the at least one processor to perform operations comprising:
receiving a first parameter regarding operation of a first platoon;
receiving a second parameter regarding operation of a first vehicle of the first platoon, the second parameter comprising at least a fuel economy of the first vehicle;
comparing at least one of the first parameter or the second parameter to a predetermined threshold, the predetermined threshold comprising at least a predetermined fuel economy value;
responsive to determining that at least one of the first parameter or the second parameter satisfies the predetermined threshold when the first vehicle is part of the first platoon, determining an exit parameter for the first vehicle, wherein determining that the parameter satisfies the first predetermined threshold is responsive to the fuel economy of the first vehicle being at or below the predetermined fuel economy value; and
causing the first vehicle to exit the first platoon based on the exit parameter.

18. The non-transitory computer-readable storage media of claim 17, wherein the first parameter is a fuel economy of the first platoon such that the first parameter satisfies the predetermined threshold when the fuel economy is less than the minimum fuel economy when the first vehicle is part of the first platoon.

19. The non-transitory computer-readable storage media of claim 17, wherein the first parameter is a fueling value for each vehicle the first platoon, the second parameter further comprises a fueling value of the first vehicle, and the predetermined threshold further comprises a predetermined fueling value such that the second parameter further satisfies the predetermined threshold when the fueling value is different than the predetermined fueling value by a predetermined amount.

* * * * *